(12) United States Patent
Zhang et al.

(10) Patent No.: US 10,474,476 B1
(45) Date of Patent: Nov. 12, 2019

(54) TECHNIQUES FOR LOGGING INFORMATION

(71) Applicant: Nicira, Inc., Palo Alto, CA (US)

(72) Inventors: Lele Zhang, Beijing (CN); Dousheng Zhao, Beijing (CN); Keyong Sun, Beijing (CN); Yonggang Wang, Beijing (CN); Frank Guo, Beijing (CN)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 16/022,310

(22) Filed: Jun. 28, 2018

(51) Int. Cl.
| | | |
|---|---|---|
| G06F 17/40 | (2006.01) | |
| G06F 11/22 | (2006.01) | |
| G06F 11/30 | (2006.01) | |
| G06F 16/23 | (2019.01) | |
| G06F 9/445 | (2018.01) | |

(52) U.S. Cl.
CPC ................ *G06F 9/44505* (2013.01)

(58) Field of Classification Search
CPC .................................................. G06F 9/44505
See application file for complete search history.

(56) References Cited

U.S. PATENT DOCUMENTS

| | | | | |
|---|---|---|---|---|
| 8,327,324 B1* | 12/2012 | Gong | ................. | G06F 11/3624 717/110 |
| 2007/0074185 A1* | 3/2007 | Meijer | ..................... | G06F 8/31 717/140 |
| 2011/0231820 A1* | 9/2011 | Upadhyaya | ............ | G06F 8/423 717/124 |
| 2012/0016952 A1* | 1/2012 | Watt | ..................... | G01C 21/367 709/217 |

* cited by examiner

*Primary Examiner* — Chat C Do
*Assistant Examiner* — Noor Alkhateeb
(74) *Attorney, Agent, or Firm* — Fish & Richardson P.C.

(57) ABSTRACT

This application relates generally to logging information, and more particularly to techniques for configuring a software product to have each log call in source code controllable at runtime. The source code can be preprocessed so that individual log calls in the source code can be identified and tracked. Information specifying locations of the log calls can be used to generate a bitmap indicating whether to write log messages (corresponding to the log calls) to a log file. The preprocessed source code can then be compiled into executable code, which can be packaged with the bitmap into an executable product such that the executable code can run based on the bitmap. While the executable code is executing, examples described herein can also allow the bitmap to be updated, allowing control during execution.

20 Claims, 10 Drawing Sheets

```
//file1.c
void networking() {
    int a=5;
    a++;
    Log("networking: a=%d\n", a, "networking");
    int b=6;
    b--;
    Log("networking: b=%d\n", b, "networking", "verbose");
}
```

FIG. 2A

```
//file2.c
void storage() {
    int a=7;
    a++;
    Log("storage: a=%d\n", a, "storage");
    int b=8;
    b--;
    Log("storage: b=%d\n", b, "networking", "storage", "verbose");
}
```

FIG. 2B

| File Name | Line Number | Counter | Tags |
|---|---|---|---|
| file1.cpp | 5 | 1 | networking |
| file1.cpp | 8 | 2 | networking, verbose |
| file2.cpp | 5 | 3 | storage |
| file2.cpp | 8 | 4 | networking, storage, verbose |

FIG. 3

```
//file1.c
void networking() {
    int a=5;
    a++;
    Log(1, "networking: a=%d\n", a);
    int b=6;
    b--;
    Log(2, "networking: b=%d\n", b);
}
```

FIG. 5A

```
//file2.c
void storage() {
    int a=7;
    a++;
    Log(3, "storage: a=%d\n", a);
    int b=8;
    b--;
    Log(4, "storage: b=%d\n", b);
}
```

FIG. 5B

```
1     //Included tags
2     {tag1&tag2; tag3; tag4} s1
3
4     //Excluded tags
5     {tag5&tag6; tag7} s2
6
7     //Included files
8     {file1; file2} s3
9
10    //Excluded files
11    {file3; file4} s4
12
13    //Included lines
14    {file1::8; file2::31} s5
15
16    //Excluded lines
17    {file3::32; file4::33} s6
18
19    //Output
20    s1&s3
21
22    //Output
23    default | s5
24
25    //Output
26    ((s1-s2) | s3)-s4) | s5
```

FIG. 6

| 0 | 1 | 1 | 1 | 0 | 0 |

FIG. 7A

BITMAP FOR: default | s5 (WHERE default IS FIRST LOG IN EVERY FILE)

| 1 | 1 | 1 | 0 | 1 | 1 |

FIG. 7B

BITMAP FOR:((s1-s2) | s3)-s4) | s5

| 0 | 1 | 0 | 1 | 0 | 0 |

FIG. 7C

TECHNIQUES FOR LOGGING INFORMATION

BACKGROUND

A software application can be configured to write log messages to a log file during execution. Such log messages can record events that occur during execution of the software application and/or states of the software application at different times. However, determining whether to write particular log messages to the log file is difficult when balancing resource usage (e.g., storage space, processing power, and execution time) with effectiveness of the log file. Current logging techniques provide a one-size fits all solution that merely allows a user to define which levels (e.g., information, warning, error, etc.) of log messages to write to a log file. Accordingly, there is a need in the art to improve techniques for logging information in software applications.

SUMMARY

The present disclosure relates generally to logging information, and more particularly to techniques for configuring a software application to have each log call in source code controllable at runtime.

In certain examples, a log configuration system is provided. The log configuration system is configured to preprocess source code received by the log configuration system so that individual log calls in the source code can be identified and tracked. The log configuration system can even modify the log calls to reduce work by developers using the log configuration system.

After the source code is preprocessed, information specifying locations of the log calls (referred to as log-location information herein) is used to optionally generate a bitmap for use during runtime. In some examples, the bitmap indicates whether to write log messages (corresponding to the log calls) to a log file based on log-specification information provided by either a user or predefined as a default.

The preprocessed source code is optionally compiled into executable code, which can be packaged with the bitmap into an executable product such that the executable code can run based on the bitmap.

Some examples described herein can also provide the ability to update the bitmap while the executable code is running, such as by using log-specification information provided by a user. In such examples, log-specification information used to initially generate the bitmap is default log-speciation information, and, after the executable product is executing, user-provided specification information updates the bitmap.

DESCRIPTION OF THE FIGURES

For a better understanding of the various described examples, reference should be made to the detailed description below, in conjunction with the following drawings in which like reference numerals refer to corresponding parts throughout the figures.

FIGS. 2A-2B depict examples of source code prior to preprocessing according to certain examples described herein.

FIG. 3 depicts an example of log-location information according to certain examples described herein.

FIGS. 5A-5B depict examples of preprocessed source code according to certain examples described herein.

FIG. 6 depicts an example of log-specification information according to certain examples described herein.

FIGS. 7A-7C depict examples of bitmaps according to certain examples described herein.

DETAILED DESCRIPTION

The following description sets forth exemplary methods, parameters, and the like. It should be recognized, however, that such description is not intended as a limitation on the scope of the present disclosure but is instead provided as a description of exemplary examples.

The present disclosure relates generally to logging information, and more particularly to techniques for configuring a software product to have each log call in source code controllable at runtime.

In certain examples, a log configuration system is provided. The log configuration system can be configured to preprocess source code received by the log configuration system so that individual log calls in the source code can be identified and tracked. The log configuration system can even modify the log calls to reduce work by developers using the log configuration system.

After the source code is preprocessed, information specifying locations of the log calls (referred to as log-location information herein) can be used to generate a bitmap for use during runtime. The bitmap can indicate whether to write log messages (corresponding to the log calls) to a log file based on log-specification information provided by either a user or predefined as a default.

The preprocessed source code can be compiled into executable code, which can be packaged with the bitmap into an executable product such that the executable code can run based on the bitmap.

Examples described herein can also provide the ability to update the bitmap while the executable code is running using log-specification information provided by a user. Accordingly, log-specification information used to generate the bitmap can be default log-speciation information, and, after the executable product is executing, user-provided specification information can update the bitmap.

Figure 1:
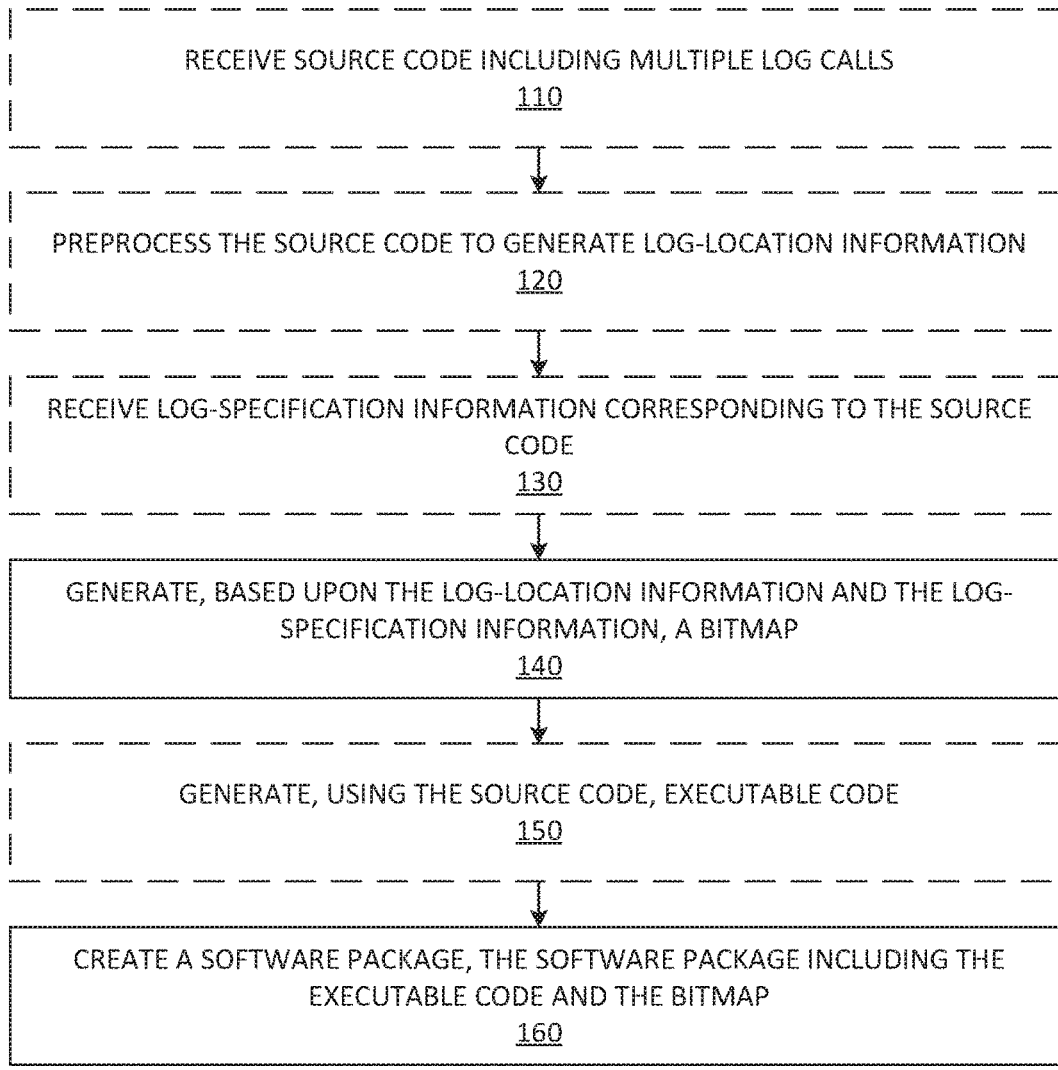
FIG. 1 depicts processing performed for configuring a software application to selectively write log messages to a log file according to certain examples described herein.

FIG. 1 depicts processing performed for configuring a software application to selectively write log messages to a log file according to certain examples described herein. The software application, as described herein, is sometimes referred to as a software package. To assist in describing FIG. 1, FIGS. 2-7 will be used to provide examples and further detailed operations.

Figure 10:
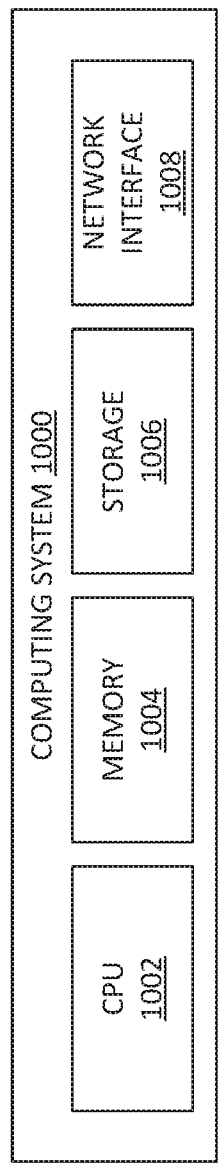
FIG. 10 depicts a computing system that can be used for some examples described herein.

The processing depicted in FIG. 1 can be implemented in software (e.g., code, instructions, program, or the like) executed by one or more processing units (e.g., processor cores), in hardware, or using combinations thereof. The software can be stored on a non-transitory computer-readable medium (e.g., a storage device, memory, or the like) or a transitory computer-readable medium. The particular series of processing operations depicted in FIG. 1 is not intended to be limiting. In some examples, the processing depicted in FIG. 1 is performed by one or more components of a log configuration system, which can be executing on a computing system (e.g., computing system 1000 as depicted in FIG. 10).

The processing depicted in FIG. 1 begins when source code is received (110). In some examples, the source code is received by a preprocessing subsystem of the log configuration system. This operation is depicted using dashed lines in FIG. 1 because it is optional. In some examples, information related to the source code (e.g., log-location information as further discussed below) is received instead of the source code.

The source code can be associated with one or more software programs (typically a single software program). The source code can specify actions to be performed by one or more processors (e.g., CPU 1002 as depicted in FIG. 10). In some examples, the source code includes a collection of computer instructions (possibly with comments) written using a human-readable programming language (e.g., ADA, BASIC, C, C++, Cobol, Fortran, Java, MATLAB, Mathematica, LISP, Pascal, PHP, Prolog, Perl, etc.), usually as plain text (e.g., data that represents characters of readable material and characters to control arrangement of text, such as line breaks or tabulation characters). The source code can include one or more files (referred to as source code files herein).

The source code received at 110 can include multiple log calls. In some examples, a log call (e.g., a log call of the multiple log calls) causes one or more log messages to be written to (e.g., stored in) one or more log files. In one illustrative example, a particular log call includes code resulting in a log message including the string "stage 1 complete" to be written to a log file whenever the particular log call is executed. In such an example, when the particular log call is executed, the log message including the string "stage 1 compete" is written to the log file. The log file where the log message is written can be stored in various locations, including local to where the source code is executed, a particular location defined by the particular log call, or the like.

The multiple log calls can be included in a single source code file of the source code or multiple source code files of the source code. For example, a first source code file can include a first log call and a second source code file can include a second log call. For another example, a first source code file can include multiple log calls while a second source code file does not include a log call.

The multiple log calls can be inserted into the source code prior to being received by the log configuration system. For example, a developer of the source code can insert the multiple log calls into the source code when the developer drafts the source code.

An example of a log call is: Log("For test only", tag1, tag2, tag3). The string "For test only" can be a log message that is written to a log file when the log call is executed. The tags (e.g., tag1, tag2, and tag3) can each be a category that is assigned to the log call. While three different tags are included in the example, it should be recognized that more or less tags can be provided and two different log calls in the source code can include a different number of tags.

The tags (sometimes referred to as categories) can be used to determine how to process log messages that are output by different log calls. For example, particular tags can be configured such that log calls with the particular tags are written to a log file while log calls without the particular tags are not written to the log file. It should be recognized that a log call can include more or less parameters than described above.

FIGS. 2A-2B depict examples of source code prior to preprocessing according to certain examples described herein. In particular, FIG. 2A depicts an example of a first file and FIG. 2B depicts an example of a second file. While the examples are written in C, it should be recognized that the examples could be written in other programming languages.

The first line in each of the examples is a comment indicating identification information of the file. For example, line 1 in FIG. 2A indicates that the code in FIG. 2A is referred to as the first file. Similarly, line 1 in FIG. 2A indicates that the code in FIG. 2B is referred to as the second file.

The second line in each of the examples is a function declaration, which includes a type of a function, a function call, and an opening bracket. In the examples, the type of the function is void, indicating that a result is not provided in response to using the function call. The function call (e.g., "networking( )" and "storage( )") indicates what to call to implement the function, including the arguments that the function requires. The arguments, if any are required, are included within the parenthesis. In the networking and storage functions, there are no arguments required. The ninth line in each of the examples includes a closing bracket, indicating the end of each function.

Lines 3-8 in both of the examples is a function definition, which is the code that implements each function. For example, line 3 in both of the examples, defines an integer "a" and assigns a value to the integer "a". In the first file, the value assigned to "a" is 5. In the second file, the value assigned to "a" is 7. Line 4 in both of the examples includes a postfix increment operator. Both of the postfix increment operators cause the integer "a" to be increased by 1 each time the function is called.

Line 5 in both of the examples includes a log call, as described above. The log call is a function that is being called within another function (e.g., the log call on line 5 in the first file is being called within the networking function). While not required, the log call can be an application programming interface (API) defined by a log configuration system. For example, the log configuration system can define the log call such that developers can use the log call in their own code to use the functionality defined by the log configuration system.

As discussed above, the log call can include multiple arguments that must be provided when calling the log call. For example, the arguments for the log call can include an output and one or more categories. In the example in FIG. 2A, the output includes a string (e.g., "networking: a=% d\n"); however, it should be recognized that the output can be different, such as a variable or a constant.

Because the string includes % d, a value can be included after the string in order to replace % d with a value. For example, because the string is followed by the variable "a", % d is replaced by the value of "a". In FIG. 2A, a log message corresponding to a first call is the string "networking a=6", because % d is replaced with the value of "a", which is 5+1. The one or more categories (e.g., "networking", "storage", and "verbose") provided by the log call can be used by the log configuration system to determine how to handle the log call when it is called, as further discussed below.

Referring back to FIG. 1, after receiving the source code, the source code can be preprocessed to generate log-location information (120). In some examples, the preprocessing occurs in response to receiving the source code. As discussed above, the preprocessing can be performed by the preprocessing subsystem of the log configuration system. This operation is depicted using dashed lines in FIG. 1 because it is optional. While the source code can be preprocessed in some examples, the log-location information can be received from a user (such as a developer) in other examples such that the preprocessing is unnecessary.

The log-location information can include identifiers corresponding to the multiple log calls included in the source code. For example, an identifier can include a file name and/or a line number for a corresponding log call. In such an example, the identifier may or may not be unique.

For another example, each log call can be associated with a unique identifier such that each log call can be distinguished from other log calls. In such an example, a unique identifier can be a value that increases by one after each log call (e.g., a first log call can be assigned a value of "1" and a second log call (which is the next log call to the first log call) can be assigned a value of "2").

For each log call, the log-location information can further include one or more tags assigned to the log call. The tags (sometimes referred to herein as categories) can be assigned by a user (such as a developer) that added the log call to their source code. A tag can be a value (e.g., a string, number, character, or the like) that can be assigned to multiple log calls such that the multiple log calls can be grouped together for the purposes of the log configuration system. When multiple tags are assigned to a single log call, the multiple tags can each be distinct such that a first tag is unrelated and does not affect a second tag.

FIG. 3 depicts an example of log-location information according to certain examples described herein. The log-location information depicted in FIG. 3 includes four types of data (represented as columns in FIG. 3): file name, line number, counter, and tags. It should be recognized that log-location information can include more or less types of data. For each type of data, the log-location information can include a value corresponding to a different log call. In FIG. 3, each row is associated with a different log call such that each row includes values for each type of data for a different log call. It should be recognized that the log-location information can be in a different format than depicted in FIG. 3.

The "file name" type of data can indicate the file name of a source code file where a particular log call is located. For example, a first row (pointed to by reference 310) can be associated with a first log call. The first row can include "file1.cpp" for the file name, indicating that the first log call is located in "file1.cpp".

The "line number" type of data can indicate the line number in a source code file where a particular log call is located. For example, the first row can include "5" for the line number, indicating that the first log call is located in line 5 of a source code file.

The "counter" type of data can indicate a unique identifier for a particular log call in a source code file. For example, the first row can include "1" for the counter, where no other log call also includes "1" for the counter. The "1" can be assigned to the first log call because the first log call is identified first when parsing the source code.

The "tags" type of data can indicate one or more tags assigned to a particular log call in a source code file. For example, the first row can include "networking" for the tags, indicating that the string "networking" was assigned to the first log call.

Figure 4:
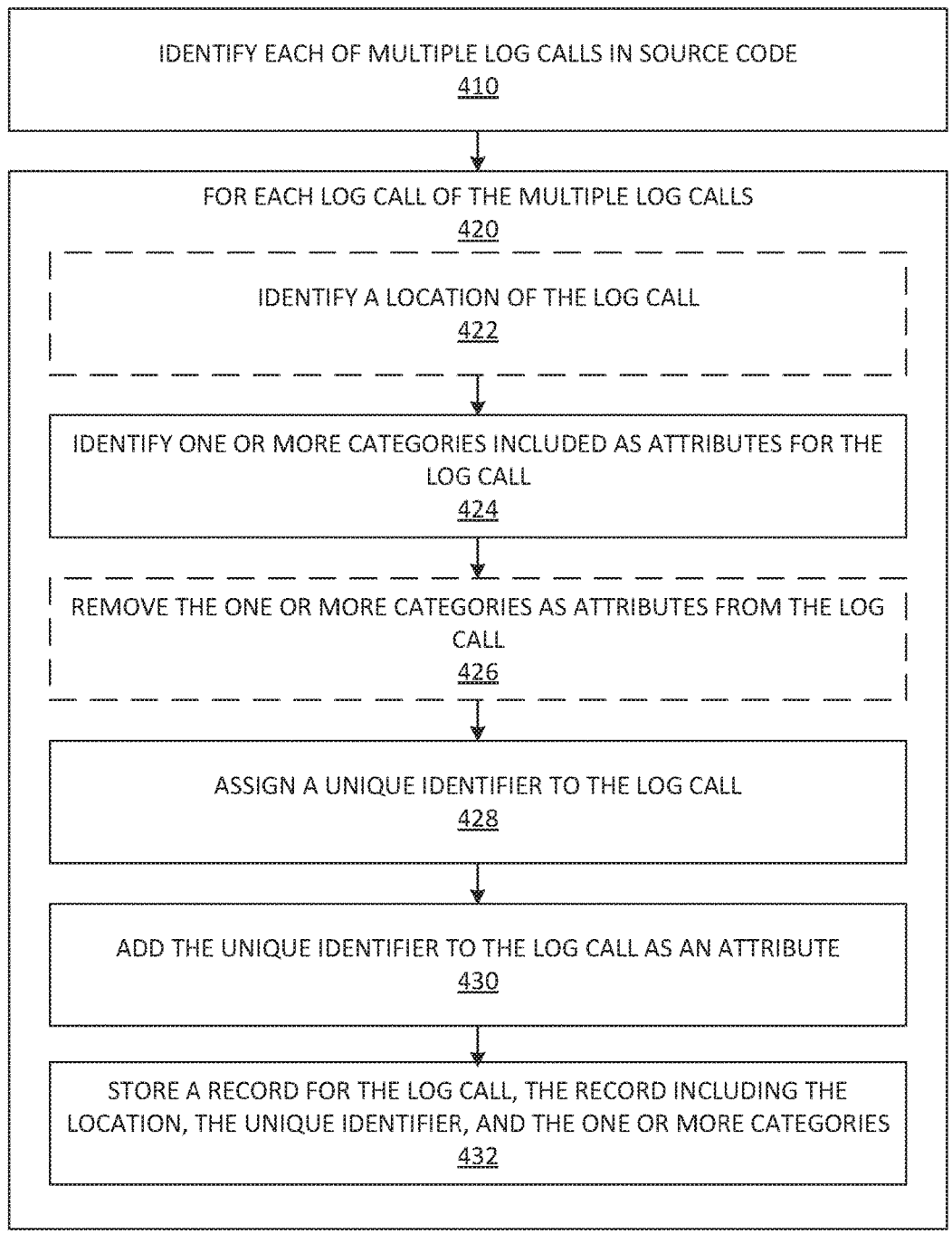
FIG. 4 depicts processing performed for preprocessing source code according to certain examples described herein.

FIG. 4 depicts processing performed for preprocessing source code according to certain examples described herein. The processing depicted in FIG. 4 can be implemented in software (e.g., code, instructions, program, or the like) executed by one or more processing units (e.g., processor cores), in hardware, or using combinations thereof. The software can be stored on a non-transitory computer readable medium (e.g., a storage device, memory, or the like). The particular series of processing operations depicted in FIG. 4 is not intended to be limiting. In one example, the processing depicted in FIG. 4 is performed by one or more components of a log configuration system executing on a computing system (e.g., computing system 1000 as depicted in FIG. 10).

The processing depicted in FIG. 4 begins when log calls are identified in source code (410). The source code can be the source code received at 110 in FIG. 1 and depicted in FIGS. 2A-2B. The log calls can be identified by parsing the source code to identify a function declaration corresponding to a log call.

For each log call identified (420), a location of the log call can be identified (422). This operation is depicted using dashed lines because it is optional. While a location can be identified in some examples, in other examples the location might not be identified.

In some examples, the location is identified as the source is being parsed. The location can be defined as a file name and a line number for a log call. However, it should be recognized that the location can be defined in other ways.

For each log call identified (420), one or more categories can be identified (424). A category can be assigned by a user (e.g., a developer) to the log call by inserting the category into an argument of the log call. For example, FIG. 2A depicts a log call as "Log("networking: a=% d\n", a, "networking")". In such an example, because arguments for Log are defined as Log([output, categories]), the category is "networking". For multiple categories, each additional category can precede the previous, as depicted in the second log call in FIG. 2A: "Log("networking: a=% d\n", b, "networking", "verbose")", where networking and verbose are each separate categories.

After identifying the one or more categories for a log call, the one or more categories can be removed as attributes from the log call (426). This operation is depicted using dashed lines because it is optional. While the one or more categories can be removed in some examples, in other examples the one or more categories can be left as attributes for each log call.

For each log call identified (420), a unique identifier can be assigned to the log call (428). The unique identifier can be used to differentiate between different log calls when determining what functions to use for output of the log calls. In one example, the unique identifiers can be a number that is increased for each subsequent log call identified while parsing the source code. For example, a first log call identified while parsing the source code can be assigned "1" and a second log call identified while parsing the source code can be assigned "2". However, it should be recognized that other types of unique identifiers can be used. After a unique identifier is assigned to a log call, the unique identifier can be added to the log call as an attribute (430), as depicted in FIGS. 5A-5B.

FIGS. 5A-5B depict examples of preprocessed source code according to certain examples described herein. The preprocessed source code has categories removed from and unique identifiers added to log calls as compared to the source code depicted in FIGS. 2A-2B.

For example, FIG. 2A depicts a first log call as "Log ("networking: a=% d\n", a, "networking")". By removing categories and adding unique identifiers, the first log call becomes: "Log(1, "networking: a=% d\n", a)", as depicted in FIG. 5A. In such an example, the unique identifier for the first log call is "1". Similar changes have been made to the other log calls in FIGS. 5A-5B. It should be recognized that unique identifiers (as described above) might not be added to log calls and/or categories might not be removed from log calls in some examples. When unique identifiers are not added to log calls, a log call can be differentiated from another log call by an identified location for the log calls, as discussed above for 422 in FIG. 4.

Referring back to FIG. 4, a record can be stored for each log call (432). The record can include one or more of: the location (as described in 422), the unique identifier (as described above in 428 and 430), the one or more categories (as described above in 424), the like, or any combination thereof.

It should be recognized that a record can include more or less information. For example, rather than storing the unique identifier, multiple records can be stored in an order that inherently includes a counter. For another example, the location might not be stored. A combination of multiple records (where each record is associated with a different log call) can be referred to as log-location information, as illustrated in FIG. 3.

Referring back to FIG. 1, log-specification information (associated with the source code) can be received (130). This operation is depicted using dashed lines because it is optional. While the log-specification information can be received in some examples (e.g., when the log-specification information is user defined), in other examples the log-specification information can be obtained when default log-specification information is being used (e.g., when a user has not defined log-specification information).

In some examples, the log-specification information can define one or more sets of log calls to indicate whether to write log messages (corresponding to log calls) to a log file. In such examples, log messages corresponding to a first set of the log calls are written to the log file and log messages corresponding to a second set of the log calls are not written to the log file. In some examples, the first set is different from the second set. In some examples, each log call included in the first set is not included in the second set, and each log call included in the second set is not included in the first set. In some examples, the first set and the second set each include less log calls than the log calls.

The log-specification information can utilize set operators with different sets of log calls to provide additional control when indicating whether to write log messages to a log file. For example, a set operator can combine two sets based on a type of the set operators. Examples of types of set operators include union, intersect, and except. However, it should be recognized that other types of set operators can be used.

FIG. 6 depicts an example of log-specification information according to certain examples described herein. The log-specification information includes different set definitions and function definitions. In the example provided in FIG. 6, each definition (e.g., a set definition or a function definition) is preceded by a comment (i.e., "//") to indicate how the definition is being used.

For example, a first definition (included in line 2) is a set definition that is defining "s1". "s1" is being defined as log calls that have (1) both tag1 and tag2, or (2) tag3, or (3) tag4. Lines 4 and 5 are also related to a set definition based on particular tags.

A third definition (included in line 8) is a set definition that is defining "s3". "s3" is being defined as log calls that are in file1 or file 2. Lines 10 and 11 are also related to a set definition based on particular files.

A fifth definition is a set definition that is defining "s5". "s5" is being defined as log calls in line 8 of file1 or line 31 of file2. Lines 16 and 17 are also related to a set definition based on particular lines in particular files.

The definitions after line 17 are all related to function definitions, which indicate which function to perform on which sets of log calls. A seventh definition (included in line 20) is a function definition that is causing log messages corresponding to a set of log calls to be written to a log file.

Each of an eighth definition (included in line 20), a ninth definition (included in line 23), and a tenth definition (included in line 26) is a function definition for writing log messages corresponding to different sets of log calls to a log file. For example, the eighth definition is the intersection of s1 and s3. The ninth definition includes a "default" set as an operand, where the default set can be predefined without reference to the source code. In particular, the ninth definition is the union of the default set and s5.

While all the function definitions described above are related to writing log messages to a single log file, it should be recognized that log messages may be written to multiple log files.

Referring back to FIG. 1, a bitmap can be generated based on the log-location information (as described above for 120) and the log-specification information (as described above for 130) (140). The bitmap can include a bit for each of the multiple log calls identified in the log-location information. In some examples, each bit of the bitmap indicates whether to write log messages (corresponding to log calls of the multiple log calls associated with the bit) to a log file. Examples of values for each bit can include true/false, a binary number to indicate true or false, or the like.

FIGS. 7A-7C depict examples of bitmaps according to certain examples described herein. The bitmaps depicted in FIGS. 7A-7C can be based on the log-location information depicted in FIGS. 2A-2B and the log-specification information depicted in FIG. 6. In particular, the bitmaps can correspond to source code including four files, where a first file includes two log calls (as depicted in FIG. 2A), a second file includes two log calls (as depicted in FIG. 2B), a third file includes one log call, and a fourth file includes one log call.

The bitmaps are depicted as a size of 6. It should be recognized that the bitmaps can be smaller or larger. Each entry in the bitmaps corresponds to a different log call. In addition, each value for each entry is depicted as either "0" or "1". The "0" is intended to represent false, or to forgo writing log messages corresponding to a respective log call to a log file. The "1" is intended to represent true, or to write log messages correspond to the respective log call to the log file. It should be recognized that other values can be used than depicted in FIGS. 7A-7C.

FIG. 7A depicts a bitmap for the set operation of s1&s3. The bitmap indicates that log messages corresponding to each of a second log call, a third log call, and a fourth log call should be written to a log file. As discussed above in FIG. 6, s1 includes tag1&tag2, tag3, or tag4. Accordingly, if tag1 is networking, tag2 is verbose, tag3 is storage, and tag4 is error, s1 would apply to the second log call (because the second log call includes both networking and verbose as tags), the third log call (because the third log call includes storage as a tag), and the fourth log call (because the fourth log call includes storage as a tag) depicted in FIG. 3. Then, because s1 includes all of the first file and the second file depicted in FIG. 3, the intersection of s1 and s2 would be the second log call, the third log call, and the fourth log call.

FIG. 7B depicts a bitmap for the set operation of default|s5. The bitmap indicates that log messages corresponding to each of a first log call, a second log call, a third log call, a fifth log call, and a sixth log call should be written to a log file. As discussed above in FIG. 6, s5 includes file1::8 and file4::33. Accordingly, if log call 2 is included in line 8 of file 1, s5 would apply to the second log call depicted in FIG. 3. Then, when default applies to the first log call in every file, the union of s5 and default would be the first log call, the second log call, the third log call, the fifth log call, and the sixth log call.

FIG. 7C depicts a bitmap for the set operations of ((s1-s2)|s3)-s4)|s5. The bitmap indicates that log messages corresponding to each of a second log call and a fourth log call should be written to a log file. As discussed above in FIG. 6, s1 includes tag1&tag2, tag3, or tag4, s2 includes tag5&tag6 or tag7, s3 includes file1 or file2, s4 includes file3 or file4, and s5 includes file1::8 and file4::33. Accordingly, the set operations of ((s1-s2)|s3)-s4)|s5 would result in the second log call and the fourth log call.

Figure 8:
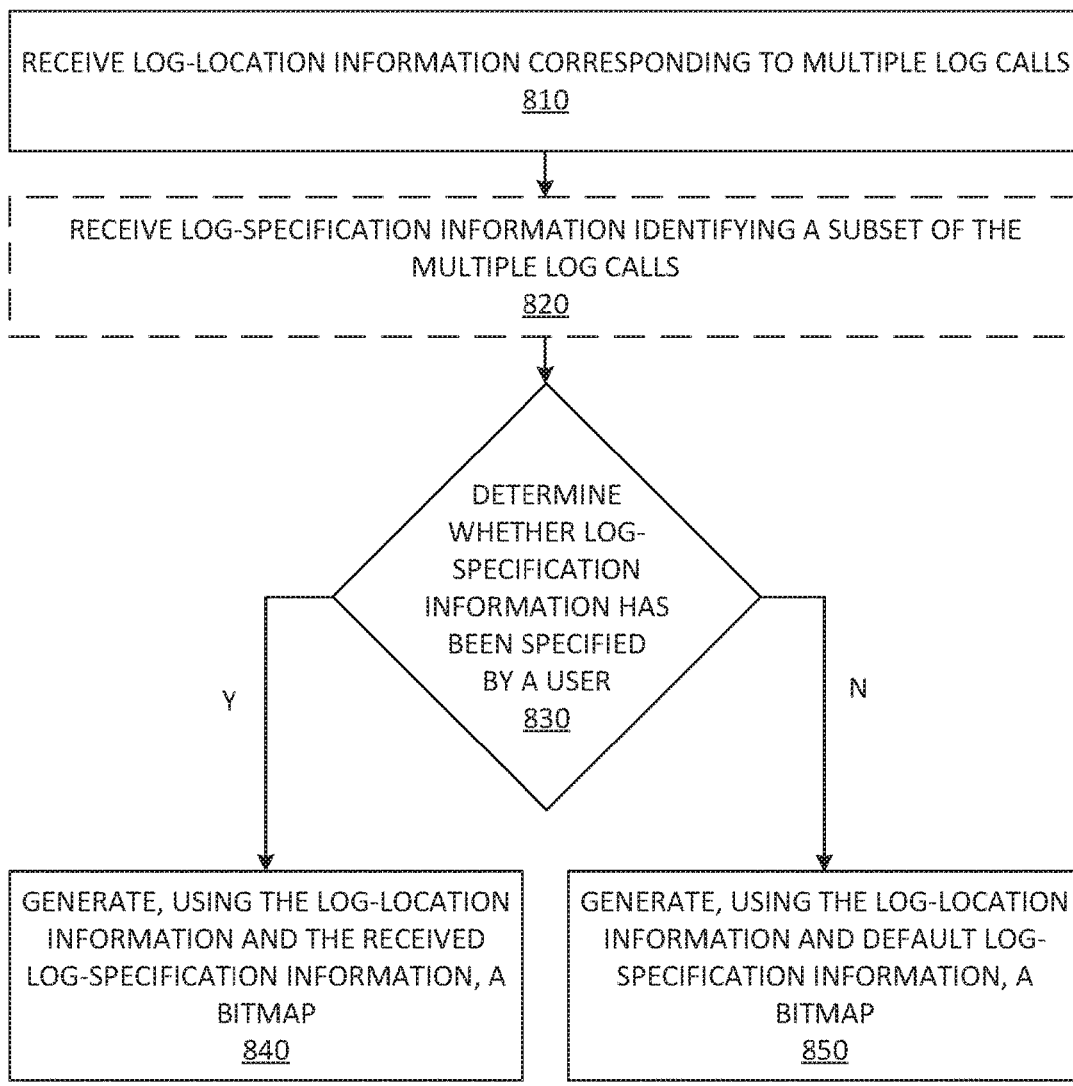
FIG. 8 depicts processing performed for generating a bitmap according to certain examples described herein.

FIG. 8 depicts processing performed for generating a bitmap according to certain examples described herein. The processing depicted in FIG. 8 can be implemented in software (e.g., code, instructions, program, or the like) executed by one or more processing units (e.g., processor cores), in hardware, or using combinations thereof. The software can be stored on a non-transitory computer readable medium (e.g., a storage device, memory, or the like). The particular series of processing operations depicted in FIG. 8 is not intended to be limiting. In one example, the processing depicted in FIG. 8 is performed by one or more components of a log configuration system executing on a computing system (e.g., computing system 1000 as depicted in FIG. 10).

The processing depicted in FIG. 8 begins when log-location information (e.g., as depicted in FIG. 3) is received (810). The log-location information can correspond to multiple log calls.

In addition to the log-location information, log-specification information (as depicted in FIG. 6) can be received (820). The log-specification information can identify a set of the multiple log calls. This operation is depicted using dashed lines in FIG. 8 because it is optional. While the log-location information can be received in some examples, the log-location information can be a default version when the log-location information is not specified by a user. In such examples, the log-location information can be obtained instead of received.

At 830, the log configuration system can determine whether log-specification information has been specified by a user. When log-specification information has been specified by a user, a bitmap can be generated using the log-location information and the log-specification information specified by a user (840). When log-specification information has not been specified by a user, a bitmap can be generated using the log-location information and default log-specification information (850).

Referring back to FIG. 1, executable code can be generated using the source code (150). For example, the executable code can be binary machine code that is generated by an assembler or compiler. The binary machine code can be stored for execution at a later time. This operation is depicted using dashed lines in FIG. 1 because it is optional. In some examples, the executable code can be received instead of generating the executable code.

As used herein, an assembler can be a program that creates object code by translating combinations of mnemonics and syntax for operations and addressing modes into their numerical equivalents. As used herein, a compiler can be a program that transforms computer code written in one programming language (e.g., a high-level programming language, such as a human-readable programming language as described below) into another programming language (e.g., a lower-level programming language, such as assembly language, object code, or machine code) to create an executable program.

Alternatively, the source code can be interpreted (by an interpreter) and thus immediately executed. As used herein, an interpreter can be a program that directly executes (e.g., performs) instructions written in a programming language (such as a scripting language) without requiring the instructions previously to have been compiled into a machine-readable language.

The executable code is packaged into a software package with the bitmap (160). The software package can then be installed on other computers such that the executable code executes on those other computers. When the software package is installed, the bitmap is stored in a memory location that is configured to be accessed during execution of the software package. The bitmap can be accessed such that log messages are written to a log file based on the bitmap. For example, while the software package is executing, one or more log calls in the software package can execute. When a log call executes, the bitmap is accessed (e.g., by accessing the memory location where the bitmap is stored) to determine whether a log message corresponding to the log call should be written to a log file. The determination includes identifying a bit in the bitmap corresponding to the log call, determining whether the bit is defined as true or false, writing a log message corresponding to the log call to the log file in response to determining that the bit is defined as true, and forgoing writing the log message corresponding to the log call to the log file in response to determining that the bit is defined as false. Such a process allows the bitmap to control whether log messages corresponding to individual log calls are written to a log file during execution of the software package.

Figure 9:
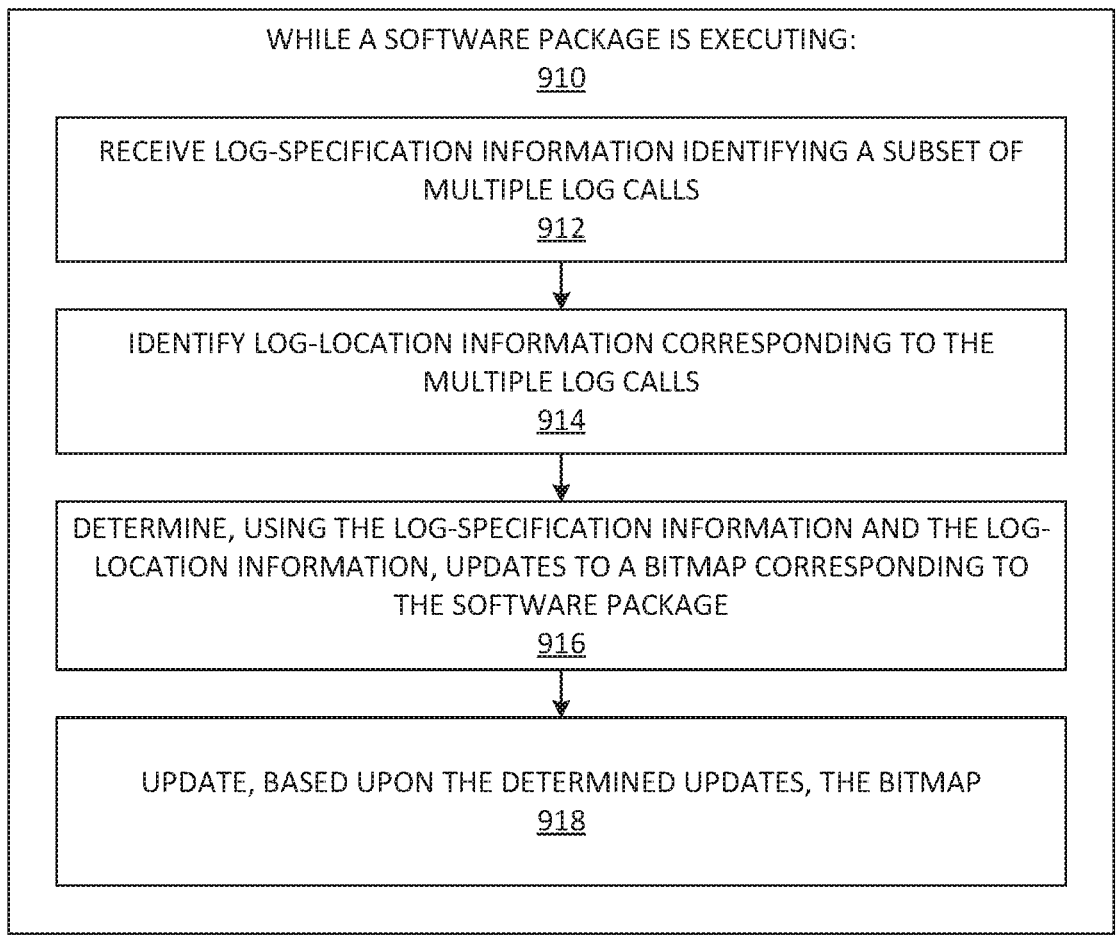
FIG. 9 depicts processing performed for updating a bitmap according to certain examples described herein.

FIG. 9 depicts processing performed for updating a bitmap according to certain examples described herein. The processing depicted in FIG. 9 can be implemented in software (e.g., code, instructions, program, or the like) executed by one or more processing units (e.g., processor cores), in hardware, or using combinations thereof. The software can be stored on a non-transitory computer readable medium (e.g., a storage device, memory, or the like). The particular series of processing operations depicted in FIG. 9 is not intended to be limiting. In one example, the processing depicted in FIG. 9 is performed by one or more components of a log configuration system executing on a computing system (e.g., computing system 1000 as depicted in FIG. 10). Each of the operations depicted in FIG. 9 can be performed while a software package is executing (910).

The processing depicted in FIG. 9 begins when log-specification information is received (912). The log-specification information can identify a set of multiple log calls.

In response to receiving the log-specification information, log-location information corresponding to the multiple log calls can be identified (914). Using the log-specification information and the log-location information, one or more updates to a bitmap can be determined (916). The bitmap can correspond to the software package.

After determining the one or more updates, the bitmap can be updated based on the determined updates (918). For example the bitmap can be replaced with a new bitmap that includes the determined updates. For another example, individual bits in the bitmap can be replaced with updated bits.

After the bitmap is updated, execution of a log call is performed based on the updated bitmap, without having to recompile the software package. For example, when the log call executes, the updated bitmap is accessed (e.g., by accessing the memory location where the updated bitmap is stored) to determine whether a log message corresponding to the log call is written to a log file. The determination includes identifying a bit in the updated bitmap corresponding to the log call, determining whether the bit is defined as true or false, writing the log message corresponding to the log call to the log file in response to determining that the bit is defined as true, and forgoing writing the log message corresponding to the log call to the log file in response to determining that the bit is defined as false. Such a process allows the bitmap to be updated during execution of the software package such that continued execution of the software package uses the updated bitmap rather than the original bitmap.

FIG. 10 depicts computing system 1000, which can be used for some examples described herein. As depicted, computing system 1000 includes hardware resources, such as one or more central processing units (e.g., CPU 1002), memory 1004, storage 1006, networking interface 1008, other conventional components of a computing device, any combination thereof, or the like.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:
   generating, using log-location information and log-specification information, a bitmap, wherein:
   the log-location information corresponds to a plurality of log calls,
   the plurality of log calls are included in one or more source code files,
   the log-location information includes identifiers corresponding to the plurality of log calls,
   the log-specification information causes a set of the plurality of log calls to be identified, the log-specification information including a plurality of set definitions and function definitions, wherein each set definition uses set operators that identify sets of log calls having particular attributes indicating whether to write log messages to a log file and wherein each function definition indicates which function to perform on which sets of log calls,
   the bitmap includes a bit for each of at least a plurality of the plurality of log calls according to the log-location information, and
   each bit of the bitmap indicates whether to write a respective log message of a respective log call to a log file according to the log-specification information; and
   causing the bitmap to be stored in a memory location, wherein:
   the memory location is configured to be accessed during execution of a software package corresponding to the one or more source code files,
   log messages corresponding to a first set of one or more log calls of the plurality of log calls are written to a log file based on the bitmap, and
   log messages corresponding to a second set of one or more log calls of the plurality of log calls are not written to the log file based on the bitmap.

2. The method of claim 1, wherein the identifiers of the log-location information are unique identifiers for respective log calls.

3. The method of claim 1, wherein the identifiers of the log-location information are file names and line numbers for respective log calls.

4. The method of claim 1, wherein the log-location information further includes, for each log call of the plurality of log calls, one or more categories assigned by a user.

5. The method of claim 1, further comprising:
   receiving the one or more source code files; and
   generating the log-location information using the one or more source code files.

6. The method of claim 5, wherein the log-location information is generated by:
   identifying one or more log calls by parsing the one or more source code files; and
   for each log call identified:
   assigning a unique identification to the log call; and
   adding the unique identification to a parameter of the log call.

7. The method of claim 5, wherein the log-location information is generated by:
   removing, for each log call identified, the one or more categories from the log call included in the one or more source code files.

8. The method of claim 1, further comprising:
   determining whether a user-specified file is provided for the log-specification information, wherein the user-specified file is used for the log-specification information when the user-specified file is provided, and wherein a default file is used for the log-specification information when a user-specified file is not provided.

9. The method of claim 1, further comprising:
   while the software package is executing:
   updating the bitmap stored in the memory location based on new log-specification information; and
   writing log messages corresponding to the plurality of log calls based on the updated bitmap.

10. The method of claim 1, further comprising:
    during execution of the software package:
    accessing a bit of the bitmap, wherein the bit corresponds to a log call in the one or more source code files;
    in accordance with a determination that the bit is a first value, storing a log message corresponding to the log call in a log file for the software package; and in accordance with a determination that the bit is a second value different from the first value, foregoing storage of the log message in the log file for the software package.

11. A non-transitory computer readable storage medium storing one or more programs, the one or more programs comprising instructions, which when executed by a device, cause the device to:
  generate, using log-location information and log-specification information, a bitmap, wherein:
    the log-location information corresponds to a plurality of log calls,
    the plurality of log calls are included in one or more source code files,
    the log-location information includes identifiers corresponding to the plurality of log calls,
    the log-specification information causes a set of the plurality of log calls to be identified the log-specification information including a plurality of set definitions and function definitions, wherein each set definition uses set operators that identify sets of log calls having particular attributes indicating whether to write log messages to a log file and wherein each function definition indicates which function to perform on which sets of log calls,
    the bitmap includes a bit for each of at least a plurality of the plurality of log calls according to the log-location information, and
    each bit of the bitmap indicates whether to write a respective log message of a respective log call to a log file according to the log-specification information; and
  cause the bitmap to be stored in a memory location, wherein:
    the memory location is configured to be accessed during execution of a software package corresponding to the one or more source code files,
    log messages corresponding to a first set of one or more log calls of the plurality of log calls are written to a log file based on the bitmap, and
    log messages corresponding to a second set of one or more log calls of the plurality of log calls are not written to the log file based on the bitmap.

12. The non-transitory computer readable storage medium of claim 11, wherein the identifiers of the log-location information are unique identifiers for respective log calls.

13. The non-transitory computer readable storage medium of claim 11, wherein the log-location information further includes, for each log call of the plurality of log calls, one or more categories assigned by a user.

14. The non-transitory computer readable storage medium of claim 11, wherein the instructions, when executed by the device, further cause the device to:
  receive the one or more source code files; and
  generate the log-location information using the one or more source code files.

15. The non-transitory computer readable storage medium of claim 14, wherein the log-location information is generated by:
  identifying one or more log calls by parsing the one or more source code files; and
  for each log call identified:
    assigning a unique identification to the log call; and
    adding the unique identification to a parameter of the log call.

16. The non-transitory computer readable storage medium of claim 14, wherein the log-location information is generated by:
  removing, for each log call identified, the one or more categories from the log call included in the one or more source code files.

17. The non-transitory computer readable storage medium of claim 11, wherein the instructions, when executed by the device, further cause the device to:
  determine whether a user-specified file is provided for the log-specification information, wherein the user-specified file is used for the log-specification information when the user-specified file is provided, and wherein a default file is used for the log-specification information when a user-specified file is not provided.

18. The non-transitory computer readable storage medium of claim 11, wherein the instructions, when executed by the device, further cause the device to:
  while the software package is executing:
    update the bitmap stored in the memory location based on new log-specification information; and
    writing log messages corresponding to the plurality of log calls based on the updated bitmap.

19. The non-transitory computer readable storage medium of claim 11, wherein the instructions, when executed by the device, further cause the device to:
  during execution of the software package:
    access a bit of the bitmap, wherein the bit corresponds to a log call in the one or more source code files;
    in accordance with a determination that the bit is a first value, store a log message corresponding to the log call in a log file for the software package; and
    in accordance with a determination that the bit is a second value different from the first value, forego storage of the log message in the log file for the software package.

20. A system comprising:
  one or more processors;
  memory; and
  one or more programs, wherein the one or more programs are stored in the memory and configured to be executed by the one or more processors, the one or more programs including instructions for:
    generating, using log-location information and log-specification information, a bitmap, wherein:
      the log-location information corresponds to a plurality of log calls,
      the plurality of log calls are included in one or more source code files,
      the log-location information includes identifiers corresponding to the plurality of log calls,
      the log-specification information causes a set of the plurality of log calls to be identified the log-specification information including a plurality of set definitions and function definitions, wherein each set definition uses set operators that identify sets of log calls having particular attributes indicating whether to write log messages to a log file and wherein each function definition indicates which function to perform on which sets of log calls,
      the bitmap includes a bit for each of at least a plurality of the plurality of log calls according to the log-location information, and;
      each bit of the bitmap indicates whether to write a respective log message of a respective log call to a log file according to the log-specification information; and
    causing the bitmap to be stored in a memory location, wherein:

the memory location is configured to be accessed during execution of a software package corresponding to the one or more source code files, log messages corresponding to a first set of one or more log calls of the plurality of log calls are written to a log file based on the bitmap, and log messages corresponding to a second set of one or more log calls of the plurality of log calls are not written to the log file based on the bitmap.

* * * * *